United States Patent [19]
Kikuchi et al.

[11] Patent Number: 5,737,095
[45] Date of Patent: Apr. 7, 1998

[54] IMAGE READING APPARATUS AND METHOD INCLUDING AN ILLUMINATING CONTROLLER

[75] Inventors: Shoji Kikuchi, Yokohama; Mineo Nozaki, Kawasaki, both of Japan

[73] Assignee: Canon Kabushiki Kaisha, Tokyo, Japan

[21] Appl. No.: 606,948

[22] Filed: Feb. 26, 1996

[30] Foreign Application Priority Data

Mar. 2, 1995 [JP] Japan .................. 7-043010

[51] Int. Cl.⁶ ................... H04N 1/04; H04N 1/46; H04N 1/38; F21V 00/00
[52] U.S. Cl. ................... 358/475; 358/509; 358/486; 358/464; 399/17; 362/276
[58] Field of Search ................... 358/505, 509, 358/474, 475, 486, 514, 464; 362/276, 802; 399/9, 17, 177; 382/176

[56] References Cited

U.S. PATENT DOCUMENTS

| | | | |
|---|---|---|---|
| 3,646,256 | 2/1972 | Jacob et al. | 358/438 |
| 3,670,099 | 6/1972 | Oliver | 358/486 |
| 3,730,988 | 5/1973 | Shimizu | 358/486 |
| 4,356,516 | 10/1982 | Koguchi | 358/261.1 |
| 4,839,740 | 6/1989 | Yoshida | 358/498 |
| 5,021,877 | 6/1991 | Tsuchiya et al. | 358/514 |
| 5,502,542 | 3/1996 | Takano | 355/69 |
| 5,650,863 | 7/1997 | Utagawa et al. | 358/475 |

FOREIGN PATENT DOCUMENTS 6-41421  10/1994  Japan .................. H04N 1/04

*Primary Examiner*—Edward L. Coles, Sr.
*Assistant Examiner*—Tia M. Harris
*Attorney, Agent, or Firm*—Fitzpatrick, Cella, Harper & Scinto

[57] ABSTRACT

An image reading apparatus includes a plurality of light sources for illuminating an original, a photoelectric conversion device for converting light from the original illuminated by each of the plurality of illuminating means, and a discriminating circuit for discriminating whether or not any image exists on the original, based on image signals output from the photoelectric conversion device at least when the original is illuminated with light from one of the light sources, which possesses spectral characteristics including green. A control circuit controls the apparatus so that, when the discriminating circuit has determined that no image exists on the original, the manner of reading of the image with the light sources other than the light source employed in the discrimination performed by the discriminating circuit is changed from the manner of reading of the image with the light source employed in the discrimination.

18 Claims, 5 Drawing Sheets

IMAGE READING APPARATUS AND METHOD INCLUDING AN ILLUMINATING CONTROLLER

BACKGROUND OF THE INVENTION

1. Field of the Invention

The present invention relates to an image reading apparatus, as well as to an image reading method, which reads an original image by employing a plurality of light sources.

2. Description of the Related Art

Various types of image reading apparatuses are known, such as, for example, the apparatus disclosed in Japanese Utility Model Publication No. 6-41421. The construction of this image reading apparatus is shown in FIG. 5. The apparatus is designed to read a red or black image on an original by employing a dichromatic light source, which provides red and yellow light. The arrangement is such that light beams emitted from red and yellow light-emitting elements LR, LY are transmitted through transmitting fibers TR, TY so as to illuminate an original (not shown), and light rays reflected by the original are received by light-receiving elements PR, PY through light-receiving fibers RR, RY, whereby an image on the original is read.

In operation, the yellow light emitting elements LY are activated first to enable determination as to whether an image exists on the original. Then, the red light emitting elements LR are lit to enable determination as to whether the color of the image is red or black. Illumination of the original with the light from the red light-emitting elements LR is not executed when an absence of an image on the original is detected as a result of the illumination with the light from the yellow light-emitting elements LY.

The known image reading apparatus of the type described above suffers from the problem that it cannot read full-color images because it uses a dichromatic light source intended for use in reading red or black images.

Another problem is that images of colors other than red and black cannot be sensed with this apparatus with high accuracy, because the image detection relies upon the use of yellow light for sensing the image. Thus, when an image of a color other than red and black is to be read by this image reading apparatus, the apparatus tends to fail to detect such an image, instead determining that there is no image on the original, causing an omission of image information which may be very important.

SUMMARY OF THE INVENTION

An object of the present invention is to provide an image reading apparatus which is capable of reading images quickly and accurately.

Another object of the present invention is to provide an image reading apparatus which can operate with reduced electrical power and which can stand longer use.

Still another object of the present invention is to provide an image reading apparatus which has a reduced size and which can be produced at a reduced cost.

A further object of the present invention is to provide an image reading method which enables images to be read quickly and accurately.

A still further object of the present invention is to provide an information processing apparatus which can detachably mount thereon an image reading apparatus capable of reading images quickly and accurately.

A still further object of the present invention is to provide an information processing apparatus which can detachably mount thereon an image reading apparatus operable with reduced electrical power and capable of withstanding a long period of use.

A still further object of the present invention is to provide an information processing apparatus which can detachably mount thereon an inexpensive small-sized image reading apparatus.

To these ends, according to one aspect of the present invention, there is provided an image reading apparatus, comprising: a plurality of illuminating means for illuminating an original; photoelectric conversion means for converting light from the original illuminated by each of the plurality of illuminating means; discriminating means for discriminating whether or not any image exists on the original, based on image signals output from the photoelectric conversion means at least when the original is illuminated with a light from one of the illuminating means possessing spectral characteristics including green; and control means for effecting such a control that, when the discriminating means has determined that no image exists on the original, the manner of reading of the image with the illuminating means other than the illuminating means employed in the discrimination performed by the discriminating means is changed from the manner of reading of the image with the illuminating means employed in the discrimination.

The image reading apparatus having the features stated above can determine without fail whether or not any image exists and can eliminate any wasteful reading operation, thus enabling quick reading of the image. The apparatus can operate with reduced power consumption and can withstand a long period of use, achieving reduction both in size and production cost.

According to another aspect of the present invention, there is provided an image reading method comprising the steps of: illuminating an original by a plurality of illuminating means; and converting light reflected from the original into image signals; wherein presence or absence of an image on the original is discriminated based on the image signal obtained at least when the original is illuminated with illuminating means among the plurality of illuminating means which possesses spectral characteristics including green, and, when it has been discriminated that no image exists on the original, control is performed in such a manner that the manner of reading of the image with the illuminating means other than the illuminating means employed in the discrimination is changed from the manner of reading of the image with the illuminating means employed in the discrimination.

This method enables images to be read without fail, in a short time.

According to still another aspect of the invention, there is provided an information processing apparatus capable of detachably mounting an image reading apparatus which comprises a plurality of illuminating means for illuminating an original and photoelectric converting means for converting light emitted from each illuminating means and then reflected from the original into image signals, the information processing apparatus comprising: discriminating means for discriminating whether or not any image exists on the original, based on image signals output from the photoelectric conversion means at least when the original is illuminated with a light from one of the illuminating means possessing spectral characteristics including green; and control means for effecting such a control that, when the discriminating means has determined that no image exists on the original, the manner of reading of the image with the illuminating means other than the illuminating means employed in the discrimination performed by the discriminating means is changed from the manner of reading of the image with the illuminating means employed in the discrimination.

Thus the invention also provides an information processing apparatus which detachably mounts an image reading apparatus capable of reading images without fail in a short time. At the same time, the invention provides an image processing apparatus which detachably carries an image reading apparatus capable of operating with reduced power consumption and withstanding a long period of use, while achieving reduction both in size and production cost.

These and other objects and features of the present invention will be clear from the following description taken in conjunction with the accompanying drawings.

DESCRIPTION OF THE PREFERRED EMBODIMENT

Figure 1:
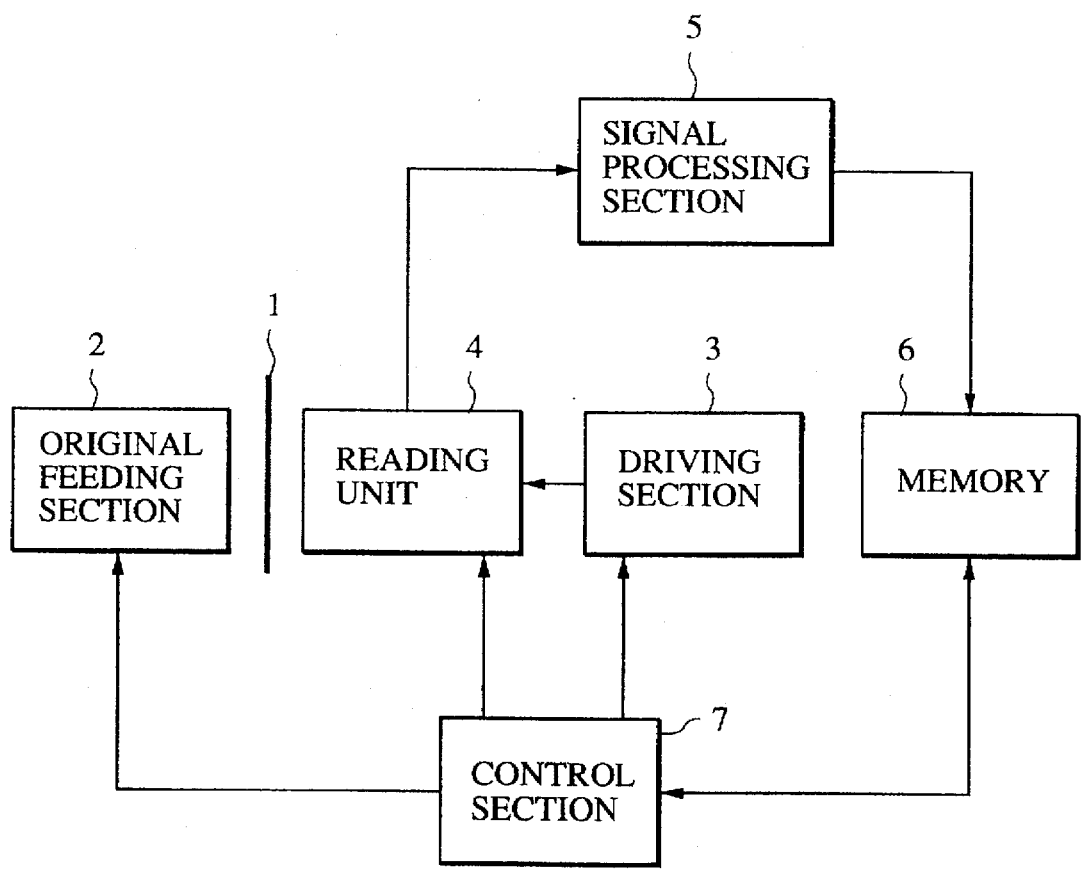
FIG. 1 is a block diagram showing the construction of an image reading apparatus as an embodiment of the present invention.

Referring to FIG. 1, which is a block diagram showing the construction of an image reading apparatus embodying the present invention, an original 1 is fed by an original feeding section 2. An image on the original 1 is read by a reading unit 4, which is driven by a driving section 3. The read image undergoes predetermined processings such as shading correction and gamma correction, by signal processing section (s), and the processed image is stored in a memory 6. A control section 7 conducts overall control of the apparatus.

Figure 2:
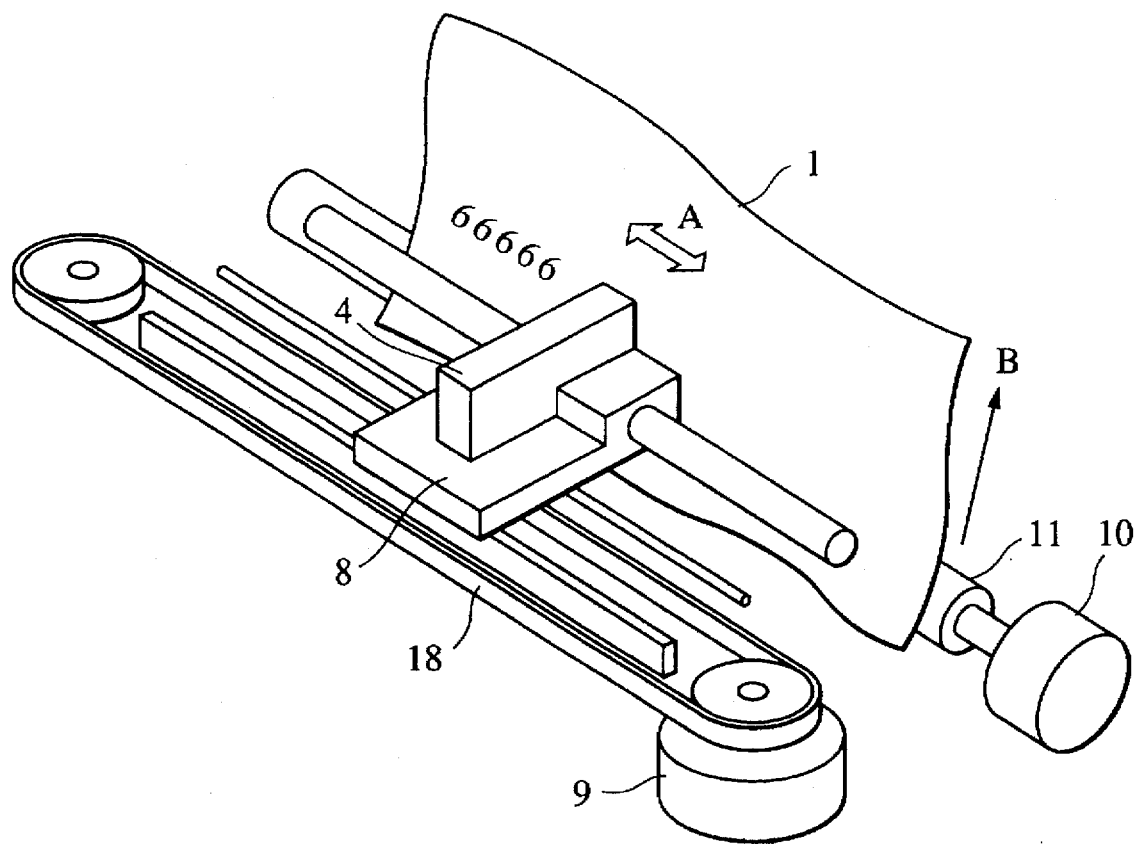
FIG. 2 is a perspective view of a portion of the embodiment of FIG. 1, showing particularly a reading unit and portions around the reading unit.

Referring now to FIG. 2 which shows a portion of the image reading apparatus of FIG. 1, the reading unit 4 is carried by a carriage 8, which is driven by a motor 9 through a belt 18, so as reciprocatingly to move in the directions perpendicular to the direction of feeding of the original 1, as indicated by the double-headed arrow A. The original 1 is fed in the direction of the arrow B by means of a roller 11, which is driven by a motor 10.

The reading unit 4 is detachable from the carriage 8. The arrangement is such that a printing unit (not shown) can be carried by the carriage 8 after removing the reading unit 4 therefrom, thus allowing the apparatus to operate also as a recording apparatus.

Figure 3:
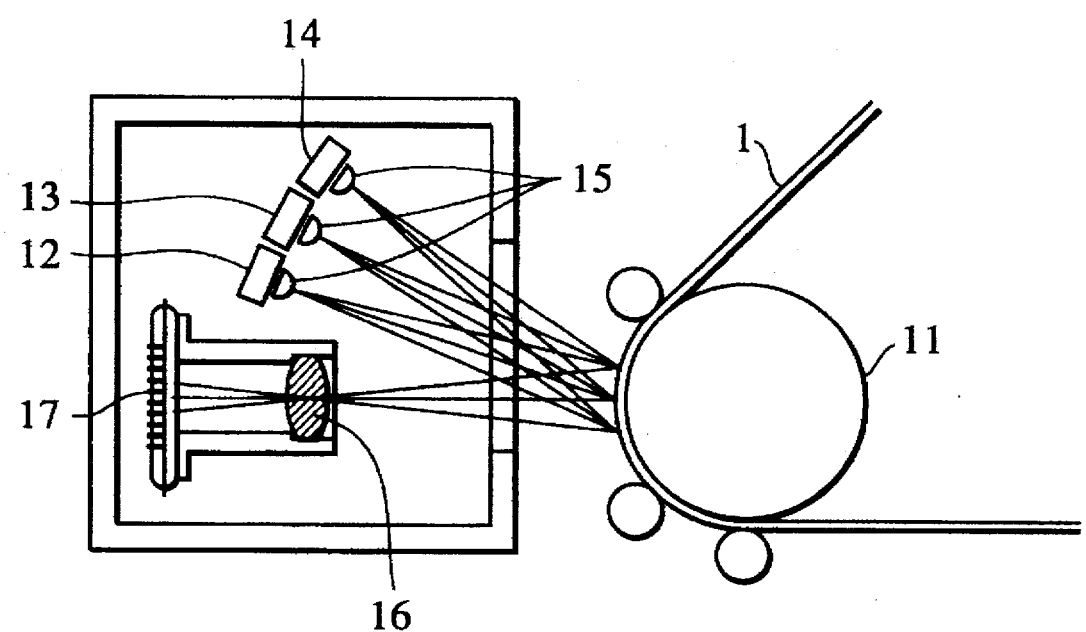
FIG. 3 is a sectional view of the embodiment of FIG. 1, showing particularly the reading unit and portions around the reading unit.

FIG. 3 is a sectional view of the apparatus taken along a plane near the reading unit 4. Referring to this figure, a red light source 12 for emitting red light, a green light source 13 for emitting green light and a blue light source 14 for emitting blue light are sequentially lit, and the light from each light source is condensed by an associated lens 15 so as to be focused on the original 1. The light reflected from the original 1 is focused through a lens 16 onto a CCD 17 so as to be converted into image signals.

Figure 4:
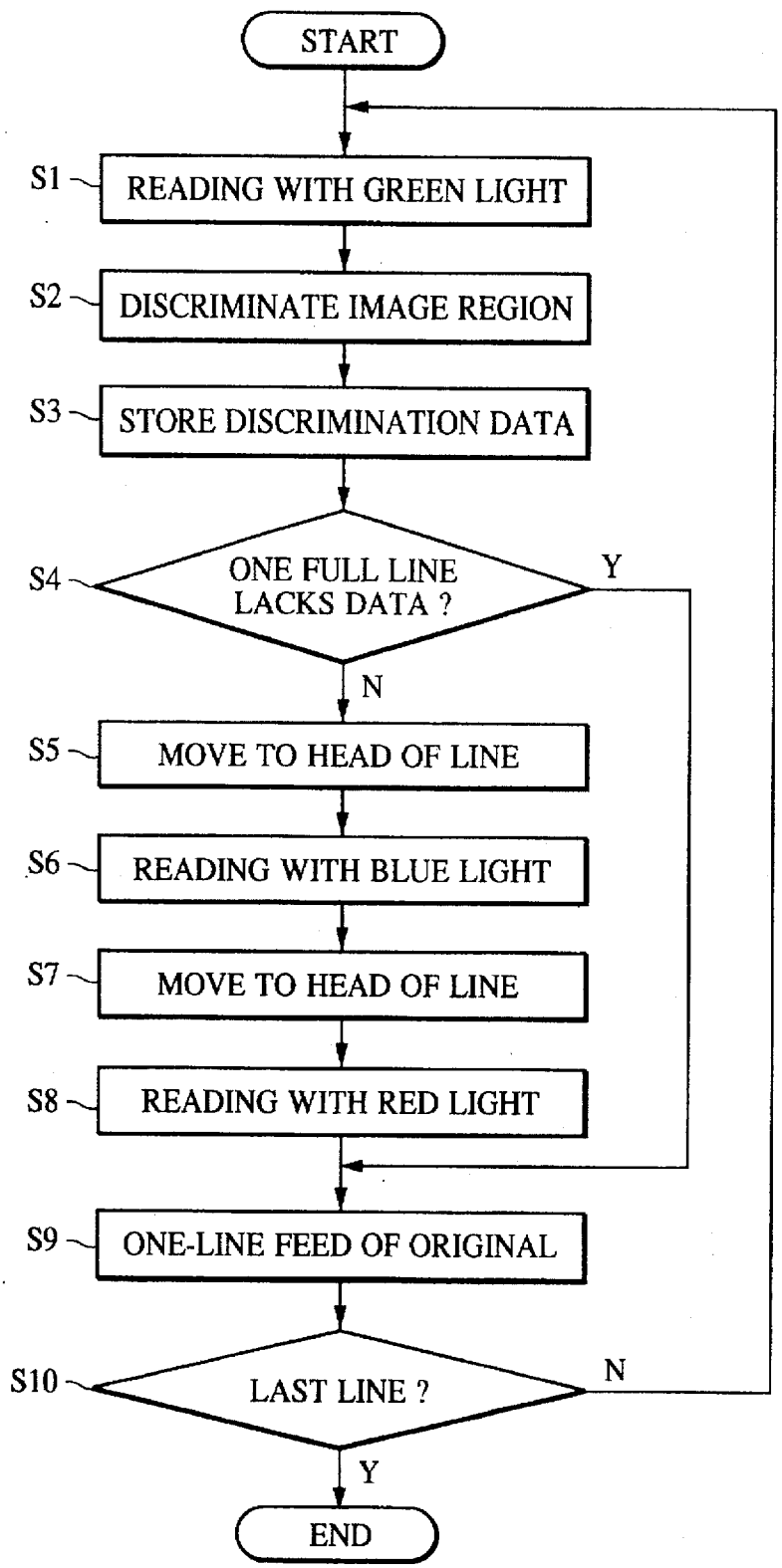
FIG. 4 is a flow chart showing an image reading process performed by the embodiment of FIG. 1.
Figure 5:
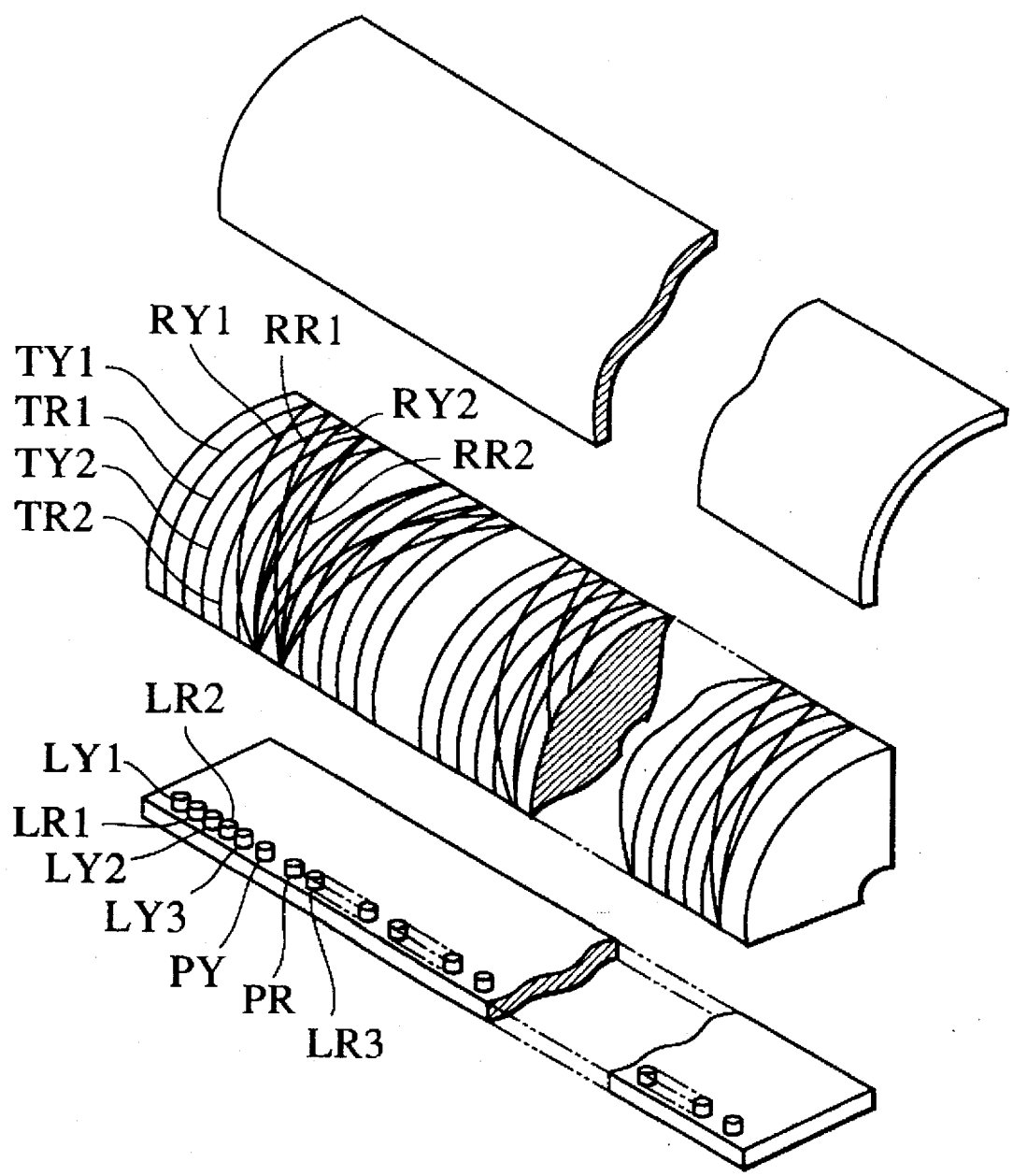
FIG. 5 is a perspective view of a portion of a known image reading apparatus.

The operation of the image reading apparatus will be described with reference to the flow chart shown in FIG. 4. Step S1 executes a reading operation by illuminating the original with the light from the green light source 13. The process then proceeds to Step S2, in which an image region on the read original is discriminated. The discrimination data is then stored in the memory 6 in Step S3. Thus, in this embodiment, whether an image exists or not is determined by using the green light from the green light source 13. The wavelength of the green light is roughly in the middle of the visible region of wavelength. Thus, a considerably wide spectrum of colors can be sensed using green light. It should be noted, however, that the use of green color light is not essential, and a wide range of colors can be sensed equally well using other colors of light containing a green component, such as cyan or magenta.

The process then proceeds to Step S4, which determines whether or not one full line lacks any data. If the answer is YES, i.e., if one full line lacks data, the process proceeds to Step S9, in which the control section 7 gives instructions to the original feeding section 2 to cause the latter to feed the original 1 by an amount corresponding to one line.

Conversely, when the answer is NO in Step S4, i.e., when data exists in the line, the process proceeds to Step S5 in which the reading unit 4 is moved to the head of the line. The process then advances to Step S6, in which a reading operation is executed to read the original with light from the blue light source 14 and further to Step S7, in which the reading unit 4 is moved again to the head of the line, followed by reading of the original with the light from the red light source 12.

The process then skips to Step S9, in which the original is fed by one line and advances to Step S10, in which determination is made as to whether the present line is the last line. If the present line is not the last line, the process returns to Step S1 to repeat the described sequential operation. If the present line is the last line, the reading operation is terminated.

Thus, the described embodiment employs three light sources of red, green and blue, for the purpose of reading an original, and the green light which is emitted by the green light source from among these three light sources and which is roughly in the middle of the visible region of light wavelength is used as the sensing light for sensing the presence or absence of image data on the original. As a consequence, the presence or absence of data can be determined without fail, making it possible to read an image at high speed. Furthermore, the construction of the whole apparatus is simplified because of elimination of the necessity to provide a light source which is to be used exclusively for the detection of the presence of image data, thus contributing to a reduction in size and cost of the apparatus. Furthermore, the described embodiment extends the life of illuminating means, while preventing wasteful use of electrical power, by eliminating any wasteful illumination.

In the described embodiment, when the absence of an image is confirmed through illumination with a color light, further illumination by other light sources is prohibited. This, however, is not exclusive, and the arrangement may be such that illumination by all other light sources is executed even when the absence of an image has been confirmed, but with photoelectric conversion by the CCD prohibited for image data obtained through illumination by light sources other than the light source employed in the determination as to whether an image exists or not. Such an arrangement eliminates noise which is otherwise generated as a result of wasteful image processing.

Although the invention has been described with reference to its preferred form, it is to be understood that the described embodiment is only illustrative, and that various changes and modifications may be imparted thereto, For instance, the sequence of illumination by different colors of light conducted after detection of presence of an image may be changed from that in the described embodiment. The described colors of light from the light sources, which are red, green and blue in the described embodiment, are also illustrative and may be substituted by yellow, cyan and magenta, for example. The light sources may be LEDs, xenon tubes or any other suitable devices which can provide the described effect.

What is claimed is:

1. An image reading apparatus, comprising:
   a) a plurality of illuminating means for illuminating an original;
   b) photoelectric conversion means for converting light from the original illuminated by each of said plurality of illuminating means into image signals and outputting the image signals;
   c) discriminating means for discriminating whether or not any image exists on the original, based on the image signals output from said photoelectric conversion means at least when the original is illuminated with light from one of said plurality of illuminating means possessing spectral characteristics including green; and
   d) control means for effecting control so that, when said discriminating means has discriminated that no image exists on the original, the manner of image reading with the illuminating means other than the one illuminating means employed in the discrimination performed by said discriminating means is changed from the manner of image reading with the one illuminating means employed in the discrimination.

2. An image reading apparatus according to claim 1, wherein said control means performs the control so as to prohibit illumination by the illuminating means other than the one illuminating means employed in the discrimination.

3. An image reading apparatus according to claim 1, wherein said control means performs the control so as to prevent said photoelectric conversion means from executing conversion of the light emitted from the illuminating means other than the one illuminating means employed in the discrimination and then reflected from the original.

4. An image reading apparatus according to claim 1, wherein said illuminating means includes at least three different spectral characteristics.

5. An image reading apparatus according to claim 4, wherein the at least three different spectral characteristics comprise red, green and blue spectral characteristics.

6. An image reading apparatus according to claim 4, wherein the at least three different spectral characteristics comprise yellow, cyan and magenta spectral characteristics.

7. An image reading method comprising the steps of:
   illuminating an original using a plurality of illuminating means;
   converting light reflected from the original into image signals;
   discriminating the presence or absence of an image on the original based on the image signal obtained at least when the original is illuminated with one of the plurality of illuminating means from among the plurality of illuminating means which possesses spectral characteristics including green; and
   when it has been discriminated that no image exists on the original, controlling so that the manner of image reading with the illuminating means other than the one illuminating means employed in said discriminating step is changed from the manner of image reading with the one illuminating means employed in the discriminating step.

8. An image reading method according to claim 7, wherein said controlling step is executed such as to prohibit illumination by the illuminating means other than the one illuminating means employed in the discriminating step.

9. An image reading method according to claim 7, wherein said controlling step is executed such as to prohibit conversion into the image signal of the light emitted from the illuminating means other than the one illuminating means employed in the discriminating step and then reflected from the original.

10. An image reading method according to claim 7, wherein the illuminating means includes at least three different spectral characteristics.

11. An image reading method according to claim 10, wherein the at least three different spectral characteristics comprise red, green and blue spectral characteristics.

12. An image reading method according to claim 10, wherein the at least three different spectral characteristics comprise yellow, cyan and magenta spectral characteristics.

13. An information processing apparatus structured to detachably mount an image reading apparatus which comprises a plurality of illuminating means for illuminating an original and photoelectric converting means for converting light emitted from each illuminating means and then reflected from the original into image signals, said information processing apparatus comprising:
   a) discriminating means for discriminating whether or not any image exists on the original, based on image signals output from the photoelectric converting means at least when the original is illuminated with a light from one of the illuminating means possessing spectral characteristics including green; and
   b) control means for effecting control so that, when said discriminating means has discriminated that no image exists on the original, the manner of image reading with the illuminating means other than the one illuminating means employed in the discrimination performed by said discriminating means is changed from the manner of image reading with the one illuminating means employed in the discrimination.

14. An image reading apparatus according to claim 13, wherein said control means performs the control so as to prohibit illumination by the illuminating means other than the one illuminating means employed in the discrimination.

15. An image reading apparatus according to claim 13, wherein said control means performs the control so as to prevent the photoelectric conversion means from executing conversion of the light emitted from the illuminating means other than the one illuminating means employed in the discrimination and then reflected from the original.

16. An image reading apparatus according to claim 13, wherein the illuminating means includes at least three different spectral characteristics.

17. An image reading apparatus according to claim 16, wherein the at least three different spectral characteristics comprise red, green and blue spectral characteristics.

18. An image reading apparatus according to claim 16, wherein the at least three different spectral characteristics comprise yellow, cyan and magenta spectral characteristics.

* * * * *